United States Patent
Rubel et al.

(10) Patent No.: US 9,651,946 B1
(45) Date of Patent: May 16, 2017

(54) AUTOMATED SCHEDULE CALCULATION FOR CONTROLLING A CONSTELLATION OF SATELLITES

(71) Applicant: Planet Labs Inc., San Francisco, CA (US)

(72) Inventors: Michael Rubel, Burbank, CA (US); James Mason, San Francisco, CA (US)

(73) Assignee: Planet Labs Inc., San Francisco, CA (US)

( * ) Notice: Subject to any disclaimer, the term of this patent is extended or adjusted under 35 U.S.C. 154(b) by 0 days.

(21) Appl. No.: 15/197,540

(22) Filed: Jun. 29, 2016

(51) Int. Cl.
  *G05D 1/00* (2006.01)
  *B64G 1/10* (2006.01)
  *B64G 1/24* (2006.01)

(52) U.S. Cl.
  CPC .......... *G05D 1/0027* (2013.01); *B64G 1/1021* (2013.01); *B64G 1/1085* (2013.01); *B64G 1/242* (2013.01)

(58) Field of Classification Search
  CPC .... B64G 1/1021; B64G 1/1085; B64G 1/242; G05D 1/0027
  USPC .......................................................... 701/13
  See application file for complete search history.

(56) References Cited

U.S. PATENT DOCUMENTS

| | | | | |
|---|---|---|---|---|
| 3,532,298 A | * | 10/1970 | Swet | B64G 1/007 244/167 |
| 2002/0190160 A1 | * | 12/2002 | Fleeter | B64G 1/641 244/158.7 |
| 2013/0124079 A1 | * | 5/2013 | Olivier | B64G 3/00 701/301 |
| 2013/0275036 A1 | * | 10/2013 | Olivier | B64G 3/00 701/301 |
| 2014/0039963 A1 | * | 2/2014 | Augenstein | G06Q 10/06314 705/7.24 |
| 2015/0301192 A1 | * | 10/2015 | Leclercq | G01S 19/24 342/357.31 |

\* cited by examiner

*Primary Examiner* — Yazan Soofi
(74) *Attorney, Agent, or Firm* — Fountainhead Law Group P.C.

(57) ABSTRACT

Particular embodiments also include a optimization and simulation service that can analyze different variables for scheduling the satellites. The optimization and simulation service operates automatically to schedule satellites and ground stations to obtain their highest attainable performance relative to the system operator's goals as well as to respond to various unexpected behavior or events and performance variations, modifying the schedule accordingly. The optimization and simulation service leverages the sparsity of the system in the optimization such that the optimization and simulation service can calculate the change in utility for one satellite without reference to unimpacted satellite schedules. This allows the schedule to be calculated efficiently and provides optimum usage of the satellites.

33 Claims, 8 Drawing Sheets

AUTOMATED SCHEDULE CALCULATION FOR CONTROLLING A CONSTELLATION OF SATELLITES

BACKGROUND

Satellites can be used to take images of portions of the Earth. For example, a single satellite can be used to image certain portions of the Earth at certain times. The scheduling of this single satellite may be relatively straightforward as a user can program the satellite to image a location of the Earth at a certain time easily. However, depending on the satellite's orbit, altitude, and field of view, obtaining coverage of the Earth using the satellite can take some time. That is, this single satellite cannot effectively image the entire Earth in a short period of time in high resolution. To decrease the amount of time required to image the Earth, a large number of remote sensing satellites may be launched into space, each imaging a portion of the Earth and in aggregate to image the entirety of the Earth. To control this large number of satellites efficiently, several ground stations on different continents are required. As the number of satellites and ground stations increase with the desire to continuously image the entire Earth, and not just a small location such as a state or province, the control and coordination of the large number of satellites to image the entire Earth becomes increasingly difficult. For example, certain of the large number of satellites or ground stations may be inoperable at any given moment, requiring that the satellites or ground stations be scheduled to account for decreased capacity.

SUMMARY

In one embodiment, a method for scheduling actions in a satellite system comprising a plurality of satellites that are imaging a body is provided. The method receives a set of decision variables describing actions to be taken for components of a satellite with respect to a schedule for the plurality of satellites to image the body while the plurality of satellites are orbiting the body. A set of conflicts is generated for decision variables that cannot be performed at a same time in the schedule, wherein each conflict is associated with a list of decision variables. The method calculates a penalty value for each conflict in the set of conflicts that is based on the list of decision variables associated with each conflict, the penalty representing an impact on utility and stores penalty values for each conflict in a first storage element and the list of decision variables in a second storage element. A decision variable value for one of the set of decision variables is adjusted to change the schedule and a utility value is calculated using a utility function, the utility value measuring a value of the adjusted decision variable value on the schedule. Then, a conflict that includes the adjusted decision variable in the list of decision variables from the second storage element is located. The method calculates an adjusted penalty value based on the adjusted decision variable value and the penalty value stored in the first storage element for the located conflict and evaluates the adjusting based on the utility value and the penalty value to determine whether to accept the adjusted decision variable value to change the schedule. An adjusted schedule is output to at least one satellite in the plurality of satellites based on the adjusted decision variable.

In one embodiment, a non-transitory computer-readable storage medium contains instructions for scheduling actions in a satellite system comprising a plurality of satellites that are imaging a body, the instructions, when executed, control a computer system to be configured for: receiving a set of decision variables describing actions to be taken for components of a satellite with respect to a schedule for the plurality of satellites to image the body while the plurality of satellites are orbiting the body; generating a set of conflicts for decision variables that cannot be performed at a same time in the schedule, wherein each conflict is associated with a list of decision variables; calculating a penalty value for each conflict in the set of conflicts that is based on the list of decision variables associated with each conflict, the penalty representing an impact on utility; storing penalty values for each conflict in a first storage element and the list of decision variables in a second storage element; adjusting a decision variable value for one of the set of decision variables to change the schedule; calculating a utility value using a utility function, the utility value measuring a value of the adjusted decision variable value on the schedule; locating a conflict that includes the adjusted decision variable in the list of decision variables from the second storage element; calculating an adjusted penalty value based on the adjusted decision variable value and the penalty value stored in the first storage element for the located conflict; evaluating the adjusting based on the utility value and the penalty value to determine whether to accept the adjusted decision variable value to change the schedule; and outputting an adjusted schedule to at least one satellite in the plurality of satellites based on the adjusted decision variable.

In one embodiment, an apparatus for scheduling actions in a satellite system comprising a plurality of satellites that are imaging a body includes: one or more computer processors; and a non-transitory computer-readable storage medium comprising instructions, that when executed, control the one or more computer processors to be configured for: receiving a set of decision variables describing actions to be taken for components of a satellite with respect to a schedule for the plurality of satellites to image the body while the plurality of satellites are orbiting the body; generating a set of conflicts for decision variables that cannot be performed at a same time in the schedule, wherein each conflict is associated with a list of decision variables; calculating a penalty value for each conflict in the set of conflicts that is based on the list of decision variables associated with each conflict, the penalty representing an impact on utility; storing penalty values for each conflict in a first storage element and the list of decision variables in a second storage element; adjusting a decision variable value for one of the set of decision variables to change the schedule; calculating a utility value using a utility function, the utility value measuring a value of the adjusted decision variable value on the schedule; locating a conflict that includes the adjusted decision variable in the list of decision variables from the second storage element; calculating an adjusted penalty value based on the adjusted decision variable value and the penalty value stored in the first storage element for the located conflict; evaluating the adjusting based on the utility value and the penalty value to determine whether to accept the adjusted decision variable value to change the schedule; and outputting an adjusted schedule to at least one satellite in the plurality of satellites based on the adjusted decision variable.

The following detailed description and accompanying drawings provide a better understanding of the nature and advantages of particular embodiments.

DETAILED DESCRIPTION

Figure 1:
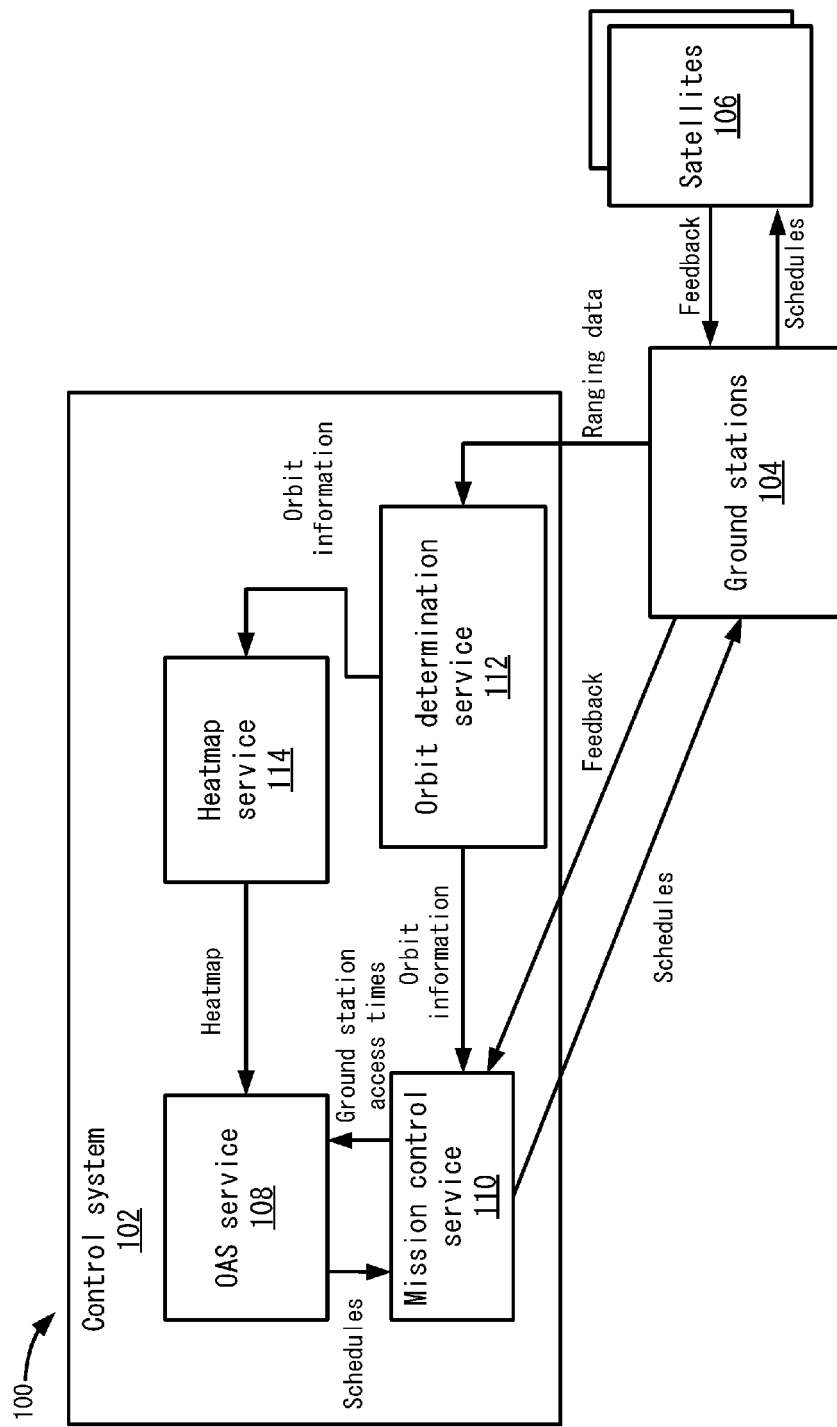
FIG. 1 depicts a system for controlling a constellation of satellites according to one embodiment.

Described herein are techniques for a satellite control system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a control system for a constellation of satellites. The control system may control various actions of the satellites, such as imaging, communication between the satellites and ground stations, and internal operation and configuration of satellites. Remote sensing applications for satellites may be constructed in one of at least two major operating modes: task based operations or monitoring. In the task based construct, remote sensing satellites may be instructed to image certain areas of the subject object. In some configurations, the task based satellites are able to change their orientation in order to accomplish the imaging task. Due to the orientation control mechanism, task based remote sensing constellations obtain images of a range of defined targets and tend to be composed of fewer satellites than monitoring constellations. In the monitoring construct, many satellites are disposed in one or more approximately uniform constellations and act in concert to achieve overall coverage of the subject object. By imaging all locations of the object more or less consistently, the objective of the tasking satellite, which is imagery of any specific location, is subsumed. To achieve complete imaging of the subject object then, monitoring constellations may be comprised of many more satellites than are necessary in a tasking constellation. As the number of satellites in a system increases, the task of scheduling those satellites to obtain their greatest utility relative to the physical constraints of the system becomes increasingly difficult.

In one embodiment, the constellation of monitoring satellites is imaging the entirety of the object over a period of time, such as one day or one rotation of the object. The control system includes a closed loop feedback system that incorporates both the observed state of the overall system as well as the desired objectives of the system. The control system can send a schedule for the constellation of satellites to ground stations, which can then send commands to the satellites to capture images of the object. In alternate embodiments, the ground stations or satellites may poll the control system for schedule and related commands Feedback information from the satellites is used by the control system to refine the schedule. The scheduling runs automatically without human intervention and can adjust the scheduling to achieve a goal of imaging the entire object.

Particular embodiments also include a optimization and simulation service that can analyze different variables for scheduling the satellites. The optimization and simulation service operates automatically to schedule satellites and ground stations to obtain their highest attainable performance relative to the system operator's goals as well as to respond to various unexpected behavior or events and performance variations, modifying the schedule accordingly. The optimization and simulation service leverages the sparsity of the system in the optimization such that the optimization and simulation service can calculate the change in utility for one satellite without reference to unimpacted satellite schedules. This allows the schedule to be calculated efficiently and provides optimum usage of the satellites. The optimization and simulation service runs automatically without human intervention to constantly model constellation behavior, and uses feedback from the satellites to adjust the schedule as will be described in more detail below.

System Overview

FIG. 1 depicts a system 100 for controlling a constellation of satellites according to one embodiment. System 100 includes a control system 102, ground stations 104, and a constellation of satellites 106. Control system 102 includes a optimization and simulation service 108, a mission control service 110, an orbit determination service 112, and a heat map service 114. Control system 102 may also include other components that will be described below. Further, control system 102 may be implemented in a single server or be distributed across multiple computing devices.

System 100 includes a closed loop feedback system that provides a schedule to ground stations 104 and satellites 106 to control their location for imaging a body (not shown) in which satellites 106 are orbiting, such as the Earth. The schedule includes an initial estimate of the state of the overall system 100 as well as the objective of the system 100 as defined by the system's operators. For example, the initial estimate of system 100 includes the number of satellites 106, each satellite's imaging capacity, each satellite's downlink capacity, and the availability, specifications, and performance of ground stations 104. The objective of system 100 includes, for example, the complete imaging of the object, prioritization of regions of the object according to assorted criteria, prioritization of data to downlink, and maintenance or other off-duty functions to be performed by the system 100. Once configured, feedback information from ground stations 104 and satellites 106 may be sent back to components of control system 102. This feedback information can contain actual observed performance of the ground stations 104 and satellites 106. This feedback information is then used by optimization and simulation service 108 to adjust the schedule.

Heat map service 114 may receive inputs that allow it to calculate important areas for imaging on the object. For example, some inputs may include the weather, sunlight calculations, customer preferences, pre-existing coverage levels, or other manual inputs that may affect the importance or relative value of imaging locations or sensed data to download, and in what order. Heat map service 114 outputs a heat map to optimization and simulation service 108 to prioritize certain actions over others in accordance with the heat map.

Optimization and simulation service 108 controls the calculation of the schedule for satellites 106. For example, optimization and simulation service 108 evaluates proposed schedule decision variables (dvs), which may be an action, such as any binary action, within system 100. For example, an action may be whether to take a sequence of images or not. The action may be evaluated with respect to various constraints in which dvs can conflict, such as two actions that cannot occur concurrently due to physical limitations, to generate a schedule for satellites 106. This schedule controls all satellites 106 and ground stations 104 to determine when and how to capture images, when to downlink images, and when to perform telemetry, maintenance, or scheduling operations. Additionally, optimization and simulation service 108 can calculate the change in utility for a change to the schedule for a satellite, including appropriate penalties for any constraint violations.

Optimization and simulation service 108 may use information other than the heat map, such as operator inputs and other information from mission control service 110. Mission control service 110 is the overall manager of the components of control system 102 as well as the human interface for operators of system 100 to obtain the current state of the system and input manual control. Mission control service 110 may be the data broker for system 100, collecting data from the components of system 100 as well as distributing data out to the other components of system 100. Mission control service 110 receives the schedule from optimization and simulation service 108 and can then communicate with ground stations 104. For example, mission control service 110 may send specific operations to different ground stations 104 based on the schedule. This may include schedule updates. In another embodiment, mission control service 110 holds the master schedule as generated by optimization and simulation service 108 and as modified by system operators, and ground stations 104 or satellites 106 poll mission control 110 for command information.

Ground stations 104 are devices that may be distributed across the object, such as on different continents. Ground stations 104 receive the operations and schedule from mission control service 110. Then, ground stations 104 may perform operations based on the schedule. For example, the operations may command satellites 106 to perform certain functions, such as change their orientation or orbit, or to perform certain telemetry or imaging actions. Ground stations 104 may only be able to communicate with satellites 106 when they are within a communication range of a ground station. For example, satellites 106 may pass over ground stations 104 at certain times and within this range, ground stations 104 can communicate with satellites 106. At this time, ground stations 104 may send information to satellites 106 to update their operations. Alternatively, at this time, satellites 106 may downlink imagery data or telemetry to the ground station for return to control system 102. Optimization and simulation service 108 may generate a schedule that takes into account when the satellite will be within a range of ground stations and what functions should be conducted during this availability period, including command and control, imagery downlink, or no communication.

Satellites 106 orbit the object. Satellites 106 include devices that perform telemetry and image capture or other remote sensing based on the schedule. For example, telemetry may involve taking measurements and transferring the measurements back to ground stations 104. Also, satellites 106 may capture images of the object using a sensor such as a camera. In one embodiment, satellites do not use crosslink communication in which the satellites communicate with each other. This means the schedule needs to be communicated to each satellite from the ground stations individually and the satellites are controlled in that way. Ranging data regarding the satellite's orbit may also be sent back to ground stations 104. Satellites 106 include storage to store information, such as the captured images or information about their orbits. The storage is limited and satellites 106 need to downlink the information to ground stations 104 before the storage reaches capacity. Optimization and simulation service 108 may generate a schedule that takes into account the storage limits of satellites 106 as well as operator preferences for desired telemetry or customer preferences for images of certain regions of the object, such as provided by heat map service 114.

Ground stations 104 receive information, such as the captured images and other information regarding the satellites orbits, from satellites 106 and can then provide certain parts of the information back to control system 102 in a closed feedback loop. For example, ground stations 104 provide ranging data to orbit determination service 112. The ranging data may be based on communications between satellites 106 and ground stations 104 and allows the tracking of satellites 106. This allows orbit determination service 112 to detect where satellites 106 are located. For example, orbit determination service 112 may predict the pass times of satellites 106 over ground stations 104, and also calculate the locations of satellites 106. Orbit determination service 112 can then, for example, provide a list of orbital elements for a given point in time. This information may be used to predict the state (e.g., position and velocity) at any point in the past or future for the orbital elements.

Orbit determination service 112 provides the list to heat map service 114 and mission control service 110. Heat map service 114 may use the list of satellites and their orbital elements to update the heat map. The heat map is updated based on which areas may have been recently imaged, which may cause the heat of those areas to go down. Also, mission control service 110 may use the list of satellites and their locations and velocities to generate ground station access times that are provided to optimization and simulation service 108. Mission control service 110 also receives schedule updates from ground stations 104. The schedule updates may be information on the extent to which schedule changes were successfully committed. Mission control service 110 can use the list of satellites and their orbital elements and also the schedule updates to generate ground station access times or areas of interest that can be provided to optimization and simulation service 108.

A closed feedback loop has been created from optimization and simulation service 108 to satellites 106 and then back to optimization and simulation service 108. The forward path may go from optimization and simulation service 108, mission control service 110, to ground stations 104 and satellites 106. Then, the return path may go from satellites 106 to ground stations 104 to orbit determination service 112, and heat map service 114. Further, the return path also goes from orbit determination service 112 to mission control service 110. Optimization and simulation service 108 receives the feedback information and then can calculate or adjust the schedule for satellites 106.

Empirical Operation

The closed feedback loop permits the empirical operation of system 100. The performance of ground stations 104 and satellites 106 are estimated when initialized (e.g., at time 0) and improve and degrade over time. A variety of factors account for this performance variance, including orbital planes and phasing, hardware and software improvements, increasing the number of radio transceivers at either the ground stations or aboard the satellites, the effects of compression on varying source imagery, atmospheric fluctuations, mechanical failure, and damage due to radiation or other sources of degradation. Additionally, the ground stations 104 and satellites 106 may be heterogeneous in nature such that the capabilities of the resources is different. For example, satellites 106 may have different sensors or radios. Additionally, ground stations 104 may have antennae's of varying size and capability. System 100 is tolerant to these variations by evaluating the probability that certain functions will or will not occur according to an initial estimate and, over time, according to observed behavior. System 100 gathers data about event probabilities from the various elements of the system and adjusts the schedule and duty cycle to enable overall system performance to match as closely as possible the operator's objectives.

Due to the large number of ground stations 104 and satellites 106, the loss or degradation of any one of the ground stations 104 or satellites 106, through the closed loop feedback system and empirical model, results in loss of performance less than proportionate to the capacity of the lost resource. This is accomplished by scheduling other resources to compensate for the loss by, for example, increasing the duty cycle of remaining resources or opportunistically rebalancing imaging and downlinking tasks to ameliorate the incurred loss.

System 100 can optimize and recover from unexpected events by re-calculating the schedule for satellites 106. This calculation uses a utility function to evaluate the utility of taking an action. The utility is a measurement that measures the value of one event over another. A penalty is then assessed for constraint violations, if any. The penalty is selected to leverage the sparsity of system 100, which means that one change in the schedule may not affect a large proportion of the elements in system 100. The system 100 is said to be sparse, as the principal resource in the system, satellites 106, may be largely optimized independently of one another. The limitation to this general premise may be found where satellites 106 compete for limited resources (e.g., only one satellite can communicate with a ground station at a time), may be subject to radio interference from cross talk, or are not able to perform duplicative or redundant tasks (e.g., image the same area). Optimization and simulation service 108 can optimize the schedule faster when assuming the system is sparse because the schedules for unaffected satellites 106, such as satellites 106 which are not utilizing the same resources experiencing the conflict giving rise to the penalty, do not need to be reconsidered. Rather, the effect of the action of the current satellite 106 may only be considered by optimization and simulation service 108 with respect to the resources, such as ground stations 104, that the current satellite 106 may compete for. In this case, the entire optimization does not need to be re-run when a change is made to the schedule. This is important when a large amount of satellites performing many actions are being optimized.

Closed Loop Feedback Flow

Figure 2:
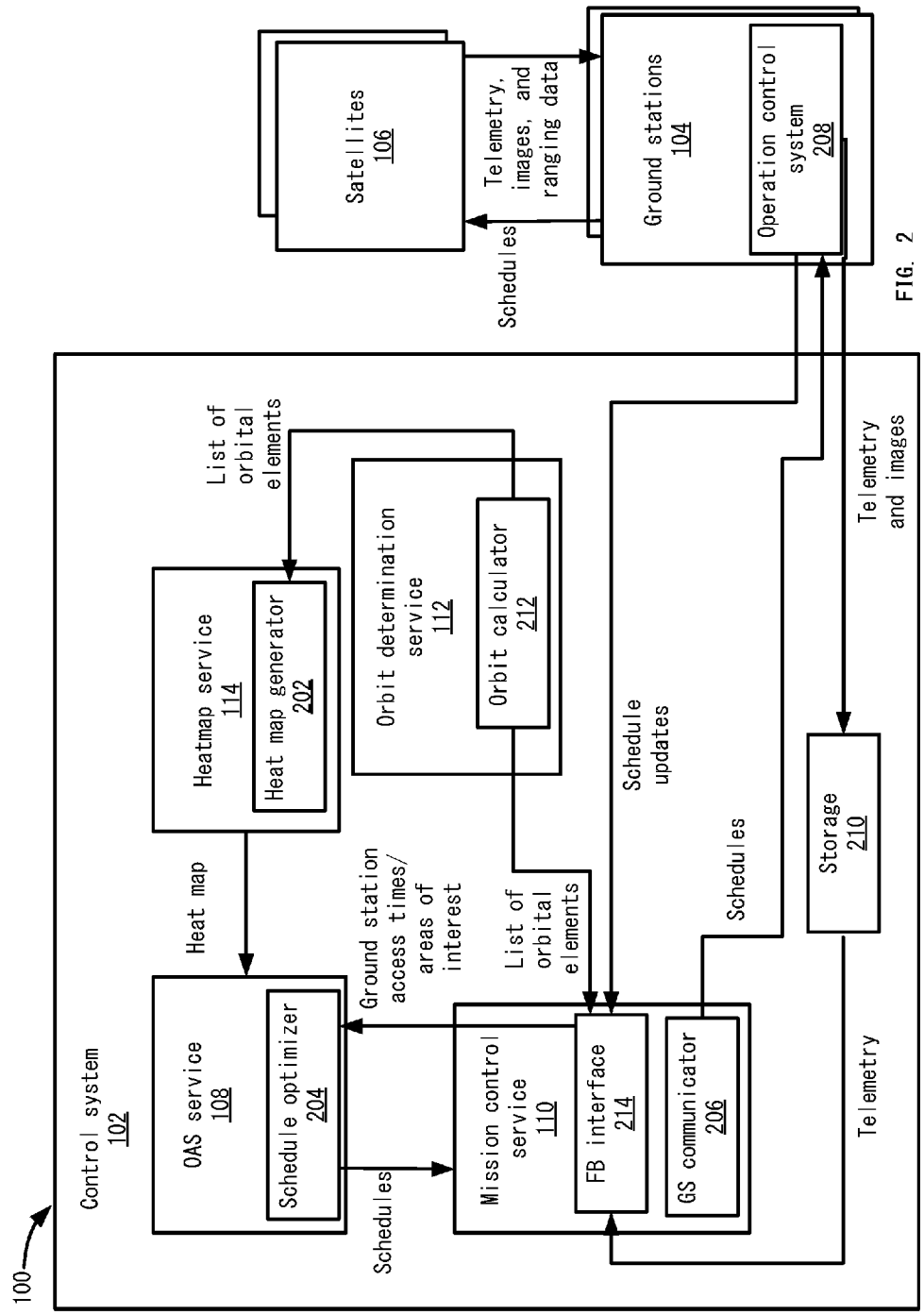
FIG. 2 depicts a more detailed example of the flow of data in the system according to one embodiment.

FIG. 2 depicts a more detailed example of the flow of data in system 100 according to one embodiment. Heat map service 114 includes a heat map generator 202 that receives information that it can use to generate the heat map. For example, the information may include cloud prediction, which may be weather data that predicts atmospheric transparency over the object. The cloud cover data may be needed to adjust locations where images can be taken by satellites. Also, heat map service 114 receives land maps, which describe the features, such as land and water, across the object. Customer data is also received, which may be areas and time ranges of importance for customers. These are areas in which customers may want to have images taken more frequently.

In the return path for the feedback loop, heat map generator 202 also receives a list of satellites. The list of satellites may include attributes for the satellites, such as their orbital elements. The list of satellites allows heat map generator 202 to extrapolate the locations of satellites, and where images may be taken. Heat map generator 202 may then be able to use the list of satellites to determine areas that may be imaged more frequently or with better coverage based on the orbital elements. This may affect the heat map. Heat map generator 202 then generates the heat map and can provide it to optimization and simulation service 108. The heat map may show where important areas on the object are and where resources should be directed to image those areas.

A schedule optimizer 204 of optimization and simulation service 108 generates the schedule using the heat map in addition to other feedback information received from mission control service 110. For example, the feedback information includes potential ground station contact times and geometries and also areas of interest. Areas of interest are areas of the body that system 100 is interested in and therefore seek to image with greater priority. The areas of interest may be due to customer interests, current world events, or the operator's interest in showcasing capability, calibrating instruments, or shoring up coverage gaps. Schedule optimizer 204 adjusts the dvs and constraints using the feedback information to generate the schedule that can be sent to mission control service 110. The schedule includes a ground station schedule and also a satellite schedule. This schedule may include actions for a ground station 104 or a satellite 106 to perform to control the imaging of the object. The operation of schedule optimizer 204 will be described in more detail below.

Mission control service 110 receives the schedule and a ground station communicator 206 can determine control information for different ground stations 104 and satellites 106. Ground station communicator 206 can then communicate the control information to specific ground stations 104 with which satellites 106 will be able to communicate with at certain times.

Each ground station 104 may include an operation control system 208 that communicates with satellites 106. Operation control system 208 may use the control information to control satellites 106 when satellites 106 are within communication range. For example, operation control system 208 may send commands and schedules to satellite 106. The commands may cause satellite 106 to perform certain actions and the schedule is used to determine when satellite 106 should take images.

Satellites 106 then respond to the commands and capture images of the Earth. The captured images of the object may be stored in onboard storage of satellites 106, and are provided back to operation control system 208 when downlink opportunities exist. For example, satellites can downlink the images when within a range of a ground station 104, otherwise satellites 106 store the images until the downlink can be performed. When the images are received, operation control system 208 can then store the images in storage 210. Further, satellites 106 may provide telemetry readings back to operation control system 208, which can then store the telemetry readings in storage 210.

Satellite 106 provides ranging data back to operation control system 208, which can then provide the ranging data to orbit determination service 112. Orbit determination service 112 includes an orbit calculator 212 that uses the ranging data to calculate a list of orbital elements.

Ground station 104 then provides feedback information back to mission control service 110, which can then use the feedback information to provide information back to optimization and simulation service 108. For example, a feedback interface 214 receives schedule updates, telemetry readings, and the list of orbital elements. Feedback interface 214 can then send the information to schedule optimizer 204, which generates ground station access times and areas of interest using the feedback information.

The above then completes the feedback loop from optimization and simulation service 108 to satellites 106, and back. Schedule optimizer 204 can use the feedback information to generate an update to the schedule. By providing the closed loop system, schedule optimizer 204 can respond to random events with changes to the schedule. These changes may be evaluated in response to the occurrence of an event, or during a periodic reevaluation of the schedule based on the feedback, state of the system, and operator input. Also, the schedule may be optimized over time to create a more complete image of the object. For example, the system may not require that a 100% coverage of the object be performed at all times. Rather, the imaging may start at around 95%, but with feedback information, schedule optimizer 204 may gradually optimize the schedule to increase the coverage to around 100%. This feedback includes data such as the imaging capacity of the satellites 106 in the form of onboard storage, compression ratios, onboard power supply, and image downlink efficiency. These and other similar variables fluctuate in response to varying hardware and software configurations, global weather patterns, time of year, atmospheric fluctuations, and the schedule availability of ground stations 104. Further, using the feedback information, schedule optimizer 204 may respond to random events that may occur, such as satellites failing, weather changing, ground stations failing, or other events. Schedule optimizer 204 accounts for this variance over time and adjusts the schedules of all elements in system 100 to obtain the desired coverage of the object by, for example, increasing the imaging duty cycle of satellites 106 or selection and duration of communication passes with ground stations 104.

Optimization and Simulation Service

Optimization and simulation service 108 is used in part due to the scale of the constellation of satellites 106 that need to be controlled. For example, when a large number of satellites (e.g., over ten, one hundred, or other larger values) need to be controlled to image the whole object, or a large part of it, the problem of scheduling is a complicated process that cannot be efficiently performed manually within a reasonable period of time such as might be necessary to prevent spoilage. Spoilage refers to time in which satellites are not scheduled to perform an action in which the satellite could possibly be taking. Different complications may also arise. Each satellite may have its own operational idiosyncrasies. For example, satellites may include different hardware or software configurations and capabilities in multiple discrete constellations in different orbits and altitudes. There may also be dozens of ground stations of different hardware and software configurations on different continents. These ground stations may vary in technical capability, capacity, or permitted functions due either to policy or regulation. The imaging area is the entire land surface of the object, not just a set of small locations such as states or provinces. Thus, the system attempts to image the entire object, not specific small areas of interest, while optimizing dynamically over a uniquely complex trade space of heterogeneous satellites, ground stations and orbits.

In one embodiment, satellites 106 are controlled in a line scanner fashion in which satellites 106 are disposed in an approximately uniform constellation around the object. The satellites orbit the object in a sun-synchronous orbit and precess uniformly such that at least one of the satellites in the constellation is passing overhead at a consistent crossing time. In one embodiment, a sufficient number of satellites are available to image the object once per the object's rotation. Satellites 106 can be controlled to take images as the object rotates.

When performing this imaging, there are different events that may occur that cause the state of the system to fluctuate and thereby affect schedule. Further, the scale of the system makes controlling the system challenging for the computational resources available. For example, optimization and simulation service 108 needs to initially calculate and optimize the schedule within a reasonable period of time, such as within seconds or minutes. Efficient schedule generation is necessary to minimize spoilage among the elements of system 100. Spoilage can occur, for example, when ground stations 104 or satellites 106 are not performing their intended function, such as making radio contact or capturing imagery, or an otherwise desirable function, such as moving an antenna or charging batteries, due to the absence of instruction. Alternatively, spoilage may occur when errors in scheduling result in instructions which create conflicts such that the intended or desirable function cannot occur, such as overlapping ground station passes. Given that at any time some part of the system may fail or enter an unknown state, optimization and simulation service 108 is able to recover from this unexpected behavior automatically without intervention from a human user by adjusting and optimizing the schedule within a period of time sufficient to avoid spoilage of any element of the system.

Schedule optimizer 204 schedules the satellites 106 to capture images of the object. However, this provides more than just a schedule for satellites 106 that lists times to capture images. For example, schedule optimizer 204 also needs to take into account the limitations of mission control service 110, which also has different directives to communicate with ground stations 104. Accordingly, schedule optimizer 204 may produce schedules for execution by mission control service 110 while generating which limiting factors dominate at any time and to account for any anomalies.

Figure 3:
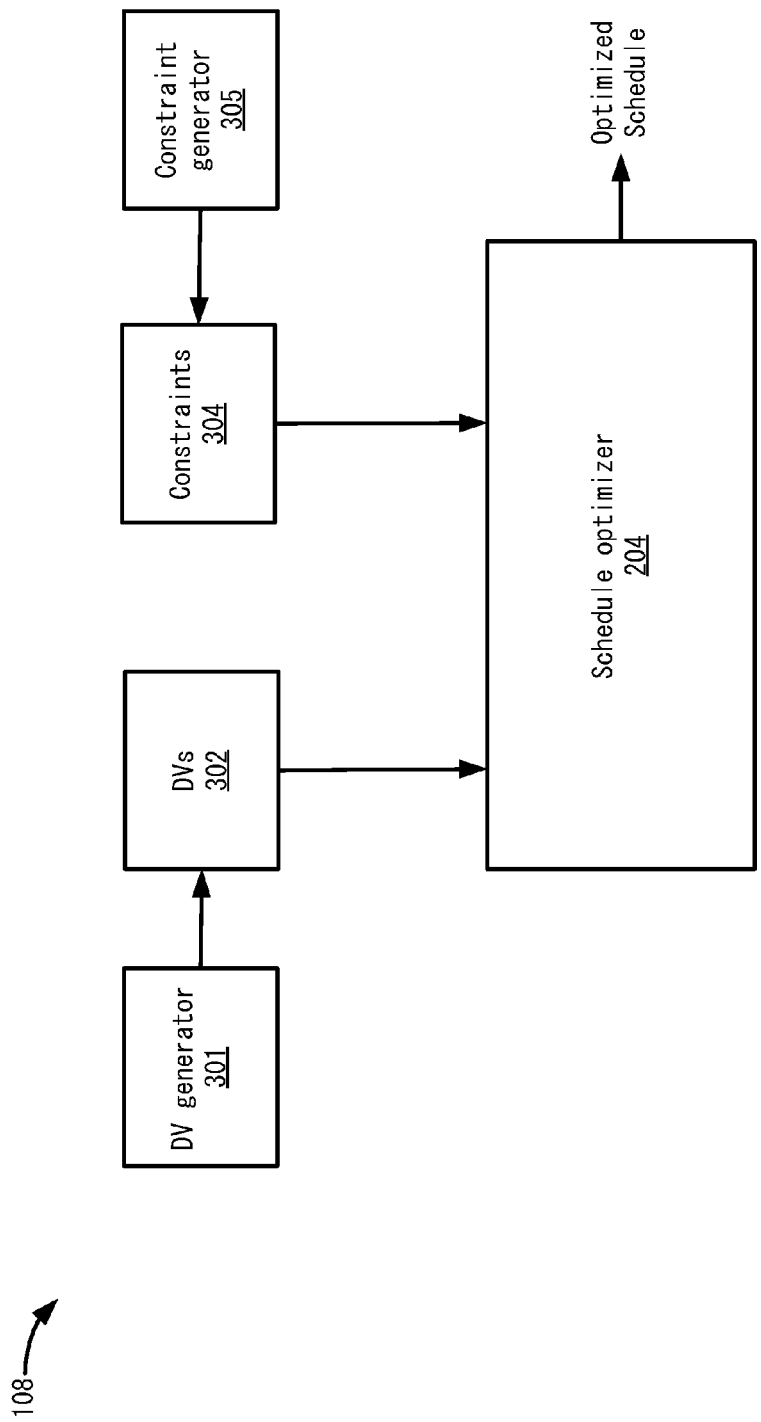
FIG. 3 depicts an example of optimization and simulation service according to one embodiment.

FIG. 3 depicts an example of optimization and simulation service 108 according to one embodiment. A dv generator 301 may receive or generate a list 302 of decision variables (dvs). A dv may be an action, such as any binary action, that may be taken in system 100. For example, the binary action may be "take" or "skip", which means satellite 106 can only take the action or skip the action. The dvs may describe the problem that needs to be solved and each dv signifies whether or not to do some activity related to the imaging. For example, one dv might instruct one satellite 106 to take a particular pass (e.g., ground station radio contact opportunity) while another dv might instruct another satellite 106 to capture images over some pre-determined period of time. The list of dvs may include a list of existing dvs, such as existing passes or imaging activities already scheduled, or dv generator 301 may generate new dvs. The new dvs may be generated based on changes to system 100, such as new ground stations may be added, which allow for new imaging and downlink activities to be performed. Alternatively, new dvs may represent possible future actions of overall system 100 given that the objective of the schedule system is to control the operations of the elements of system 100 projected into the future in view of the system operator's desired objectives. A dv generator 301 receives or generates substantially all dvs which exist in system 100.

The dvs may include all possible actions that may be taken in system 100 over all of the components in system 100 (e.g., the ground stations, satellites, etc.). The dvs can conflict and a constraint generator 305 can generate constraints 306 based on the conflicts. For example, a satellite 106 cannot downlink information and capture an image simultaneously or communicate with more than one ground station 104 at a time. Also, if nearby satellites both communicate with ground stations, the satellites may see their downlink performance degraded by radio frequency (RF) crosstalk. Additionally, there might not be enough time between two operations to move (e.g., slew) a satellite to the required orientation or move an antenna of a ground station 104. Even if there are no conflicts, a set of dvs might imply behavior that would cause a satellite to enter an unacceptable state, such as a state that might deplete the batteries of the satellite. Conflicts can be local to a satellite or span across elements of system 100, such as between satellites and ground stations, or among multiple satellites.

Even when all constraints 306 are satisfied, not all schedules may be achievable. There may be no opportunity to schedule activity that must be scheduled in advance. Or there may not be enough advance notice to change a course of action that was scheduled earlier.

List 302 of dvs may be a proposed schedule for the entire constellation of satellites 106 over a defined period of time (e.g., from time 0 to time N, or from time 0+X to time N). For example, each dv may have a status for the activity associated with the dv, such as take or skip. The given schedule may violate constraints 306, or not be achievable for other reasons. Constraints exist where, for any given resource, no more than one dv can be taken concurrently. Although only one dv can be taken is described, resources may be capable of taking different numbers of dvs, such as a resource may process two dvs concurrently, but no more. Scheduler optimizer 204 simulates and optimizes the schedule taking into account which dvs are likely to succeed and which dvs are not likely to succeed (e.g., along with an estimate for the probability of failure). Schedule optimizer 204 outputs a value, such as a single figure of merit referred to as a utility value, for each dv. The utility value for a dv may be affected based on different considerations. For example, acquiring and downlinking images that are scheduled increase utility in proportion to the image's value, which may be established by heat map service 114. However, constraint violations may decrease the utility via a penalty. Schedule optimizer 204 generates information for the violations that are referred to as intervals of interference (IOIs). Each IOI is associated with the respective dvs that conflict for an activity. Whenever a violation of an IOI is present, the penalty assessed is larger than the utility value of the dvs. Schedule optimizer 204 finally selects only positive utility values and thus, upon modeling all possible dvs, the utility value associated with dvs, all possible constraints, and deducting penalties from the utility values for encountered constraints, the final schedule is free of constraints.

Schedule optimizer 204 may generate states for all dvs in list 302. The states may include timelines for every satellite and ground station antenna, annotated with projections for variables such as battery state of charge and data on board for each satellite. Further, the total utility and penalties and various aggregate statistics may be associated with each dv. Also, when a dv is selected to be skipped, schedule optimizer 204 may adjust the states to reflect the changes. For example, choosing to take a presently-skipped downlink dv might cause data on board and battery state of charge to subsequently decrease for a satellite, cause a major downlink operation to violate a state of charge bound, or to be starved for data, and might interfere with another operation on the same satellite or with a satellite nearby. Schedule optimizer 204 may report all projected consequences of every change. Further, many changes to dvs may be performed at the same time, such as when an antenna for a ground station 104 may go down, which may skip all associated dvs for that antenna, schedule optimizer 204 may calculate all of the changes due to that failure.

Schedule optimizer 204 may take the utility for the dvs and perform a walk-through of the space of possible schedules. This skips and backdates dvs in different combinations and optimizes the schedule based on the utility. Schedule optimizer 204 may use a simulated annealing process to perform the optimization. In one embodiment, schedule optimizer 204 arrives at a globally optimal solution in a matter of seconds or minutes. The solution may not achieve a 100% coverage for imaging of the object, but that may not be necessary on the first run. The schedule may converge toward 100% coverage as feedback information is received and processed, and schedule optimizer 204 optimizes the schedule.

A list of inputs is shown in Table 1. The inputs may include a list of satellites (SATS), a list of antennas (ANTS), a list of assisting dvs, and upload time (UPLOAD_NLT_TIME), power model parameters (PWR_LOADS), a power model trajectory (PV_POWER.TRAJ), a state projection (STATE_PROJ), imaging heat maps (IMAGING_HEAT.TRAJ), and reservations.

TABLE 1

List and description of input files

| Name | Description |
|---|---|
| sats | List of all satellites, along with their model attributes, not including power model attributes |
| ants | List of all antennas (or ground station), along with their model attributes |
| dvs | List of all existing dvs, such as passes or imaging activities already scheduled in mission control. (In addition to these, optimization and simulation creates new dvs.) |
| pwr loads | Power model parameters, exclusive of photovoltaic generation |
| pv power.traj | Power model trajectory giving the expected photovoltaic generation as a function of time for each satellite. |
| imaging heat.traj | per-satellite imaging heat as a function of time. Imaging heat specifies how much to value imagery acquired at that location and time, based on business needs, cloud forecasts, existing coverage, and other factors such as sun angle. Used to update the value of existing imaging dvs and to create new imaging dvs where appropriate. (optional; if missing, creates no new imaging dvs) |

Table 2 shows the outputs. The outputs include a CHANGESET, a NEW, a STATE_PROJ, and an imaging heat trajectory IMAGING_HEAT.TRAJ. In Table 2, the output indicates a list of dvs that have changed from take to skip, or take to skip, a list of new dvs to take, projections for battery state of charge and data on board, and a copy of the input imaging heat trajectory annotated with takes and skips.

TABLE 2

List and description of output files

| Name | Description |
| --- | --- |
| changeset | List of dvs from the dvs input file which have changed from take to skip, or vice-versa |
| new | List of new dvs to take |

Schedule Optimization

Schedule optimizer 204 may perform the optimization at any time, such as at a time 0 or when changes occur to system 100 that might affect the dvs, such as ground stations or satellites are added to system 100 or when system operators express manual changes and overrides to the schedule in mission control 110. This optimization takes into account all dvs. The process described may be performed at time 0, and also during operation of system 100. Over time, the system, using feedback, improves overall efficiency or output. This is the empirical aspect of the system where the system performs actions with an unknown or estimated starting probability of success, the system is allowed to run without constraints and the results are observed, and the system adjust the probability of an action occurring or not according to actual observed success rates.

Attrition Locking

Schedule optimizer 204 compiles the input information. In one embodiment, schedule optimizer 204 takes the loaded dvset and augments the dvset with various annotations and flags and creates a new representation that is intended for rapid evaluation. Included in the dvset may be different classes of satellites, such as different hardware configurations or different states, as well as manual operator input as recorded in mission control service 110. For example, there may be more capable hardware variations, satellites in commissioning or troubleshooting states that require priority resource access, or other operator input such as experiments or maintenance commands which must be prioritized. If these variations require that certain classes of satellite or certain operator instructions be prioritized over finding a global optimum, schedule optimizer 204 reflects the intended prioritization. For example, schedule optimizer 204 may mark some dv groups as locked or immutable based on input flags that establish prioritization. The locked dvs may include all dvs not in the first group of dvs to be optimized, such as satellites in their commissioning state which require timely and high priority access to ground stations.

Schedule optimizer 204 then optimizes the unlocked dvs. Upon completion, the unlocked dvs are locked and another group of dvs may be unlocked according to an operator defined priority. In subsequent optimization cycles, the decisions taken during previous optimization cycles are considered immutable. In this way, subsequent optimization cycles may only optimize against resource opportunities that remain available at the conclusion of previous optimization cycles. This process repeats until all groups in the dvset are optimized according to the priority. Also, schedule optimizer 204 discards redundant or unnecessary dvs. For example, these dvs may remain in the dvset, but have a flag set that indicates that these dvs should not be optimized over. Also, schedule optimizer 204 creates new imaging dvs in contiguous regions where imaging heat exceeds a pre-defined threshold. These may be dvs that concentrate on areas that are deemed important via the heat map. The new imaging dvs and any existing imaging dvs have their average heat values numerically integrated from the new heat trajectory assuming piece-wise linearity.

Utility

Utility is a measurement of value, such as the weighted value, of any given action in system 100. Utility may be derived from, for example, taking an image, downlinking that image, taking a commissioning pass, and assorted related functions. In one embodiment, utility may be computed based on the images to be taken, the storage needed to store the images in the satellite, and the downlink of the images. In one example, the utility uses the following variables:

A is total number of units (e.g., megabytes, quantity, or kilometers squared) of imagery expected to be acquired by the satellite's camera;

D is total number of storage units (e.g., megabytes) of imagery expected to be downlinked to ground stations over satellite's HSD radio Aw is total heat-weighted number of storage units (e.g., megabytes) expected to be acquired by the satellite's camera. For example, if 2 MB of imagery is acquired in an area of "heat" 3, then Aw would be 6.

L is a constant times the number of taken command and control passes during which schedule and telemetry data is exchanged. L is also known as the telemetry value.

E is "engineering utility", an additional count of the number of passes without regard to downloaded data, for use by non-imaging satellites such as those in commissioning or debugging state.

A utility function is a real-valued function on the space of decision variable vectors. A decision variable is a variable that may be binary. It represents taking an action (1) or not taking an action (0), such as taking or skipping a given access, camera window, etc. A decision variable vector is a vector, of finite length, of decision variables. The gross utility U may then be found using:

$$U = \alpha Aw + \beta D + L + E \quad (1)$$

wherein the two constants α and β that satisfy $|\alpha_2 + \beta_2| = 1$.

U is the utility, α and β are constants, and A, D, L, and E are defined above. It will be understood that other utility functions may be used. By reducing utility into single valued figures, schedule optimizer 204 is able to evaluate utility objectively in relation to the overall system with a particular focus on rapid revision in view of changes. For example, by adjusting the ratio of α to β, schedule optimizer 204 can prioritize downlink or acquisition separately. It also gives utility to imaging even when there are not enough downlink opportunities in the near future to use it. Schedule optimizer 204 may use the presumption that it is better to capture images even when there is not a near-term downlink opportunity if there is no reason to not capture images Reasons to not capture images in this example may include, for example, the availability of on-board storage, which may mean there may not be enough storage on board the satellite to store future images, or the availability of sufficient energy by which to carry out the function.

From the gross utility, negative penalties are charged for any violations of the many constraints, such as falling below an allowable charge level or scheduling conflicting operations, which leave a somewhat lower net utility. Because no constraint violations should remain in the optimized solution, the gross utility is equal to the net utility after maximization and sanitizing unless certain conflicts or violations are unavoidable. Penalties can be configured such that when a change to one satellite's dv occurs, the penalty for that change can be calculated assuming the change only affects that satellite.

Constraints are enforced by charging penalties for violating the constraints and the penalties are selected to be large enough to offset any potential utility gain. For example, penalties may be multiplied by a multiplier sufficient to result in a penalty value larger than the potentially utility of a conflicting action or set of actions. This penalty multiplier may be static, set in relation to the expected scale of potential utility, or the penalty multiplier may be variable, set to offset height weighted utility. Constraints may include conflicts, in which two actions conflict and cannot be performed simultaneously, or may be singular constraints, such as battery charge state should not go below a threshold. The constraints that are conflicts may be encoded as intervals of interference (IOIs). Table 4 lists an example of constraints.

TABLE 4

List and description of conflict types

| Name | Description |
| --- | --- |
| antenna reset time | Enough time for any antenna to return to idle position between passes. |
| camera windows must not conflict | Two imaging activities on any single satellite should not overlap in time. |
| cam then hsd separation | After an imaging activity, time should pass prior to conducting downlink operations, to give the satellite time to slew, reboot and let the attitude control system settle. |
| hsd then cam separation | After a downlink activity, time should pass prior to conducting imaging operations, to give the satellite time to slew, reboot, and let the attitude controls system settle. |
| rfi | Two otherwise-independent passes, involving two different satellites and two different antennas, may block each other through potential radio frequency interference if the satellites and ground antennas are both close to each other. |

Each IOI includes a list of two or more dvs and charges a penalty if one or more of them is active. For example, if the number of active dvs participating in a particular IOI is denoted as $N_{active}$, then the number of conflicts from this IOI is defined as 0 if $N_{active} < 2$; otherwise, $N_{active} - 1$. This definition means that conflicts, such as ground station conflicts, can be counted independently per satellite, which makes marginal valuation possible. The total number of conflicts is defined as the sum of per-IOI conflicts across the entire dvset. This is different from and initially larger than the total number of dvs in a conflict state.

Schedule optimizer 204 may, during processing, eliminate IOIs that are 0 length since a conflict that does not span a finite period of time is not considered a conflict. Furthermore, redundant IOIs are eliminated. An IOI is considered redundant if, and only if, there exists another IOI whose list of dvs is a strict superset of the first IOI.

During the optimization, schedule optimizer 204 may optimize the schedule by walking through the dvs for each resource in the system, starting at 0 utility in the case of a resource which has not been previously evaluated, and toggling values while monitoring the change in utility. The optimization may be performed while the satellites are orbiting the body (e.g., Earth) and performing imaging according to the schedule. The optimization may run such that the schedule is not affected and the optimization can finish without spoilage resulting from the optimization. The optimization may be run continuously or periodically, or when it is determined that a decision variable should be changed. For example, an unexpected event may occur in the system causing a change to the value of a decision variable, the schedule may need to be changed, or feedback from the imaging of the body is used to adjust decision variable values. In one example, the probability that a decision variable occurs is observed. If the action for the decision variable does not occur, then this probably may go down, and the optimization may switch the value of the decision variable. The optimization is then run to optimize the schedule based on the change.

Figure 4:
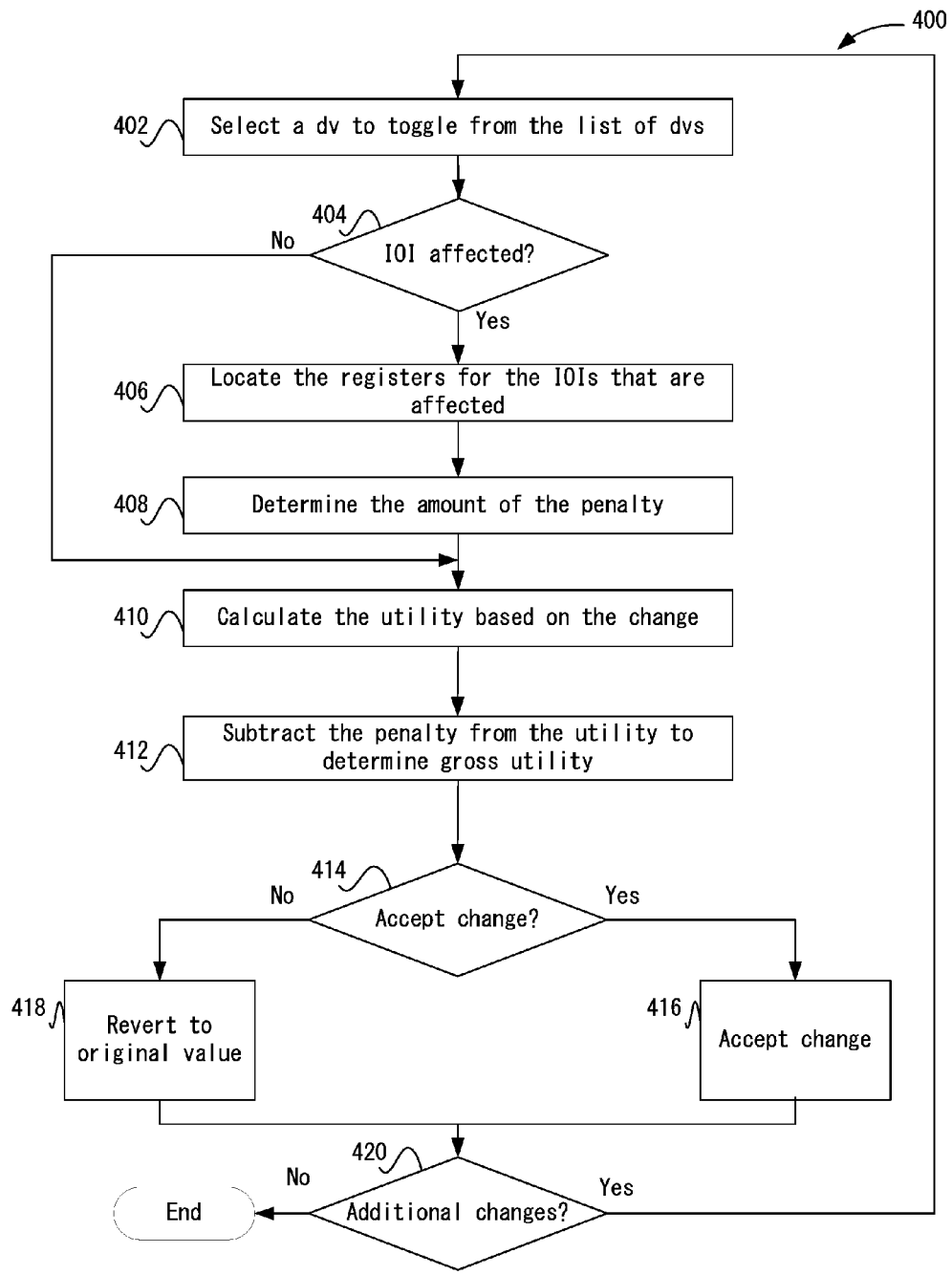
FIG. 4 depicts a simplified flowchart of a method for optimizing the schedule according to one embodiment.

FIG. 4 depicts a simplified flowchart 400 of a method for optimizing the schedule according to one embodiment. At 402, schedule optimizer 204 selects a dv to toggle from the list of dvs. For example, schedule optimizer 204 may randomly select a dv, and then toggle its state. When binary states are used, the state may be toggled from take to skip, or skip to take. In other embodiments, schedule optimizer 204 may adjust the value of the dv, such as increase or decrease the value.

At 404, schedule optimizer 204 determines if an IOI is affected because of the change in state. For example, a change from a skip to a take state may either cause a new IOI or increase a penalty for an existing IOI. Also, a change from a take to a skip state may reduce the penalty for an existing IOI and possibly eliminate an existing IOI. In the case where an IOI already exists, schedule optimizer 204 locates the IOIs that list the changed dv. When a new IOI is to be created, schedule optimizer 204 may create a register with the penalty value.

Then, if an IOI is not affected, the process continues at 410 where the utility is calculated. Then the process continues to 412 to determine whether this change should be accepted. For example, schedule optimizer 204 determines if utility was increased or decreased by the change and accepts the change if utility increased.

However, if an IOI is affected, then, at 406, schedule optimizer 204 locates the IOIs that are affected. At 408, schedule optimizer 204 determines the amount of the penalty.

Then, at 410, schedule optimizer 204 calculates the utility based on the change. The utility may be calculated as described above as the utility. For example, the utility has gone down because one action that was listed as being taken is now listed as skipped. Then, the penalty is subtracted from the utility to determine the gross utility at 412. At 414, schedule optimizer 204 determines whether to accept this change. For example, schedule optimizer 204 may accept the change when the change results in a higher gross utility at 416. However, when the change results in a lower gross utility, schedule optimizer 204 may reject the change and revert back to the original state at 418.

At 420, schedule optimizer 204 determines if additional changes to the schedule should be made to continuation the optimization. If so, the process reiterates to 402 where schedule optimizer 204 selects another dv to change. If not, the process ends when all conflicts have been resolved that can be resolved and no penalties remain, and the optimized schedule is output.

The above optimization may be processed in a very short period of time. When changes are made, schedule optimizer 204 only calculates the penalty considering the affected dvs as identified by the presence of an IOI and not the other dvs not associated with the IOI. This allows the change to evaluated quickly such that the time required to evaluate changes to the overall schedule does not increase in relation to the number of resources to be scheduled.

Penalty

Schedule optimizer 204 encodes the different ways that dvs can interfere with each other into a concept called an interval of interference (IOI). The IOI includes information for the conflict, such as a list of dvs that interfere and cannot be taken at the same time (e.g., only 1 dv may be taken at a given time). An IOI is generated when it is possible that two or more dvs can conflict at a same time when only one dv is allowed to be active at that time. Each IOI may include and store a list of two or more dvs and charges a penalty if more than one of the dvs are active. For example, if an image is to be downloaded to a ground station at a certain time, only one satellite can perform the download to the ground station at that time. Thus, if there are ten dvs that indicate ten satellites want to download an image to the ground station at a certain time, an IOI including these dvs is created. Because only 0 or 1 of the dvs can have the status of take for the IOI, a penalty may be assessed when 2 or more dvs have the status of take. No penalty may be assessed if 0 or 1 dvs have the status of take.

The IOIs take advantage of the sparsity of the system. That is, an action by a satellite generally does not affect a large number of other satellites. By calculating the IOIs before performing the optimization, schedule optimizer 204 can perform the optimization much faster than if the IOIs were not calculated. The IOIs are used because there may be conflicts when satellites want to communicate with ground stations simultaneously or when satellites want to take an image of the same area at the same time. Given that these conflicts do not affect the other satellites in the constellation, the IOIs are calculated and used to optimize the schedule. The optimization of all the dvs is not re-performed.

After generating the IOIs, schedule optimizer 204 calculates the penalties for the IOIs. For example, if the number of active dvs participating in a particular IOI (e.g., having a take status) is denoted by $N_{active}$, then the number of conflicts from this TOT is defined as 0 if $N_{active}<2$; otherwise the penalty is equal to $N_{active}-1$. This definition means that conflicts can be counted independently per satellite, which makes the marginal sparse evaluation possible. That is, when a change occurs, the conflicts can be calculated independently for that satellite without considering the other satellites. In the above example, if there are 5 active dvs with the take status, then 5 is not less than 2 and thus there is a conflict. The penalty assessed is 5−1=4. Although the formula of assessing penalties is $N_{active}-1$, other formulas may be used. For example, the penalty may be multiplied by a multiplier to ensure that the penalty charged for any given conflict is certain to be greater that the height weighted utility value of performing the conflicting dvs if concurrent performance were possible. Table 5 shows an example of the penalties.

TABLE 5

Example of register count and resulting penalty

| # of dv in IOI | penalty | multiplier |
|---|---|---|
| 0 | 0 | — |
| 1 | 0 | — |
| 2 | 1 | 1xM |
| 3 | 2 | 2xM |
| 4 | 3 | 3xM |
| . | . | . |

TABLE 5-continued

Example of register count and resulting penalty

| # of dv in IOI | penalty | multiplier |
|---|---|---|
| . | . | . |
| . | . | . |
| n | n | |

The total number of conflicts is defined as the sum of per IOI conflicts across the entire dvset. This may be different from and possibly larger than the total number of dvs in a conflict state because a dv may be involved in more than one conflict.

Once the penalties are calculated, schedule optimizer 204 allots storage space for the dv status for IOIs and the penalty values for IOIs. For example, the state of the dvs is stored in first storage elements and the state of the IOIs is stored in second storage elements. The first storage elements may be considered registers or other storage elements that can store the take or skip status for the dvs. The second storage elements may be registers or other storage elements that can store a penalty value for the IOIs. In one embodiment, the registers may store the value of the penalty for the IOI. For example, a register for the IOI may store the value of 4 in a counter, which represents that there were 4 active dvs when the penalty was last calculated. Then, after alloting all of the storage space needed, schedule optimizer 204 stores the penalties in the registers.

Schedule optimizer 204 creates and outputs data structures that are used to perform the optimization. Table 6 shows data structures that have been generated based on the above processing. These include the name of the structures and also the storage area.

TABLE 6 optimization and simulation data structures

| Name | Description |
|---|---|
| dv t | Data associated with a particular dv, for use where speed and memory are of secondary importance, such as aggregate statistics computed infrequently |
| dvset t | Omnibus structure holding the complete state of the system, including all dvs and miscellaneous information. |
| ioi t | The "base class" for conflict constraints. Includes a list of two or more dvs, of which zero or one are permitted to be in the take state. Also associated with a specific time span for informational purposes. |
| sat t | Data associated with one satellite |
| ant t | Data associated with one antenna (ground station) |

Figure 5:
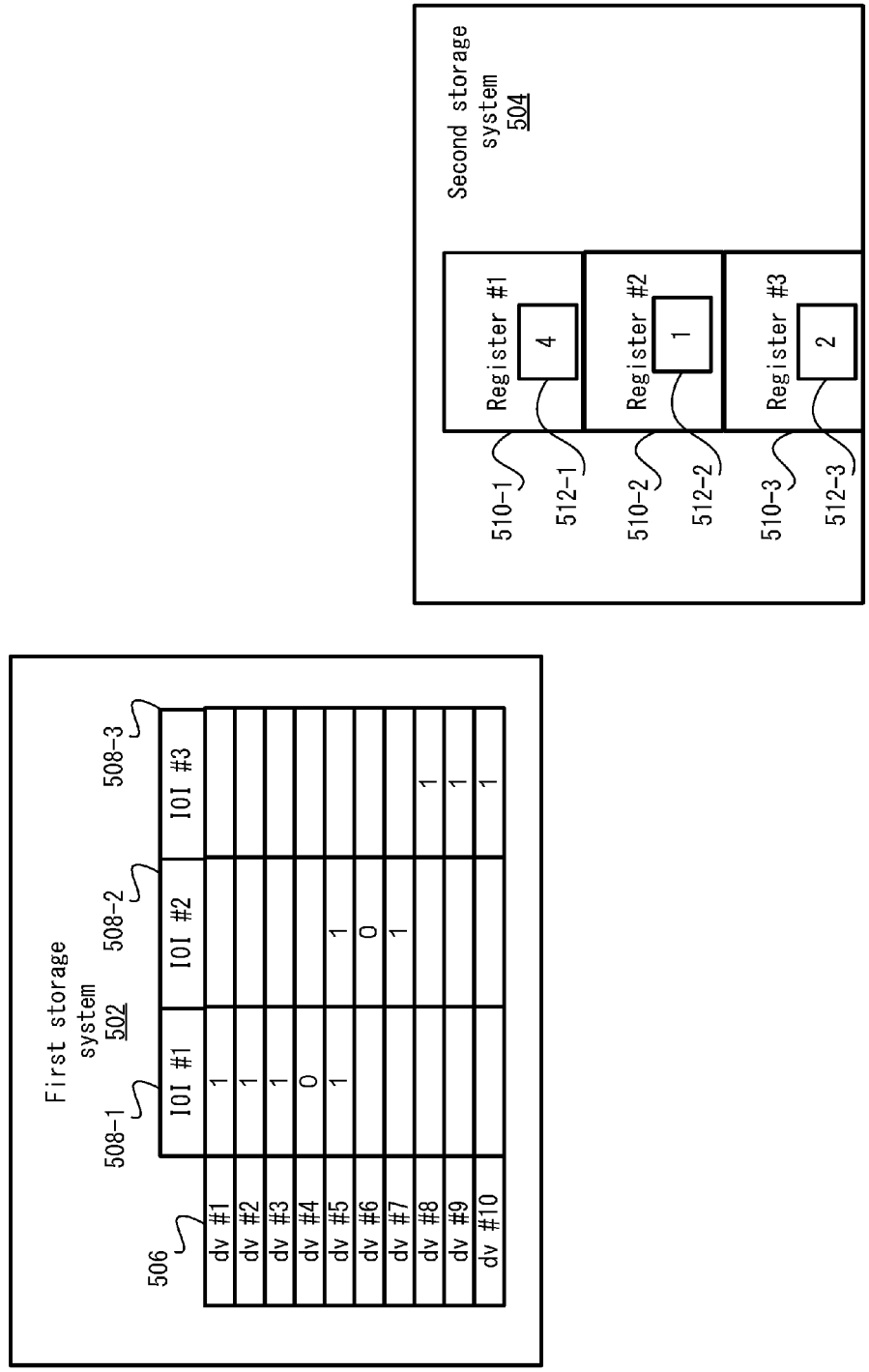
FIG. 5 shows an example of storage elements for the IOIs according to one embodiment.

FIG. 5 shows an example of storage elements for the IOIs according to one embodiment. A first storage system 502 may store the list of dvs and status for the dvs associated with the IOIs. A second storage system 504 may store the values for the penalties for the IOIs. Storage systems 502 and 504 may include different physical storage elements, such as registers, or other memory. The storage elements may be configured to toggle values, such as from 0 to 1, and back from 1 to 0. Also, the storage elements may store a value, such as information that represents integer values.

At 506, dvs for different IOIs are listed. Each dv may be associated with a different satellite. At 508-1, 508-2, and 508-3, an IOI #1, an IOI #2, and an IOI #3, respectively, are shown. Each IOI may be associated with a different set of dvs although dvs may be associated with multiple IOIs, such as dv #5 is associated with IOI #1 and IOI #2. In this case, dvs #1-#5 are associated with IOI #1, dvs #5-#7 are associated with IOI #2, and dvs #8-#10 are associated with IOI #3. For a single IOI, each dv may be associated with a different satellite. In other cases, some of the dvs may be associated with the same satellite. The dvs for a single IOI also may be the same action, such as take and downlink an image. Or, the dvs may be different actions, but conflict and thus cannot be performed at the same time. Information may be stored with the dvs to associate them with IOIs. Also, each IOI may store identifiers for the dvs that are associated with the IOI in a register.

IOI #1 has 4 dvs that have the status of take and 1 dv with the status of skip. Thus, schedule optimizer 204 determines this is a conflict based on there being more than 2 dvs with the status of take. IOI #2 has a conflict because two dvs have a status of take, dv #5 and dv #7. IOI #3 may also have a conflict as dvs #8-#10 have the status of take.

Schedule optimizer 204 may then allocate storage space for the penalty values for the IOIs. For example, in storage system 504, at 510-1, a register #1 is allocated for IOI #1, a register #2 at 510-2 is allocated for IOI #2, and a register #3 at 510-3 is allocated for IOI #3. At 512-1, the value of 4 is stored in register #1, which represents the value of the number of active dvs minus 1. This value of 4 is used to represent the penalty because 4 dvs would have to have their status changed from take to skip for there not to be a conflict. At 512-2, the value of 1 is stored in register #2 indicating that 2 dvs have the status of take and conflict for IOI #2. At 512-3, the value of 2 is stored in register #2 indicating that 3 dvs have the status of take and conflict for IOI #3.

Once the data structures are set, various actions may be taken. For example, the optimization may be run, the status of different dvs may be changed, changes to the standard dvset, calculating aggregate statistics, etc. In one example, schedule optimizer 204 may optimize the schedule. For example, the optimization may trigger the generation of a schedule based on the data structures.

In the optimization, schedule optimizer 204 randomly walks through a heuristically-determined number of steps (e.g., toggle operations on a particular dv) and monitors utility. Steps that increase utility may be accepted, such as they are always accepted, and steps that decrease utility may be accepted with a probability that decreases over time, such as according to a cooling profile (e.g., linear profile). This decreases the probability a step may be accepted over time if it decreases a utility. The state that resulted in the best overall utility is stored and output as the optimized schedule.

The utility may be computed based on the utility contribution from a particular satellite along with its change in conflict utility (e.g., penalty), or the utility may be calculated globally for all satellites. Schedule optimizer 204 may perform simulated annealing steps by computing only the changes in utility for an affected satellite, which exploits the system's natural sparsity. That is, most of the elements may not be affected by this change as, except for limited scenarios such as performing duplicate functions or contention with regard to ground station resources, the elements of the system can largely be optimized in isolation of one another. The sparsity of the system is exploited by registering dvs which potentially conflict with one another together, for example in one or more IOIs. Whenever a change occurs with one of the dvs, the schedule optimizer 204 reevaluates the utility of the associated dvs. In this way, the problem space is confined to the resources and associated dvs impacted by the change. This reduced problem space can be rapidly re-evaluated without reference to the rest of the elements (e.g., dvs) of system 100, thus exploiting the sparse association of the various elements of system 100. As a result, the processing time required for evaluating the schedule remains relatively constant irrespective of the number of resources in system 100. That is to say, the time required to evaluate the optimal schedule for any one resource, such as a satellite 106, does not scale in proportion to the number of satellites 106. As a result, the schedule for all resources in system 100 may be obtained rapidly even for monitoring constellations composed of many satellites.

Schedule optimizer 204 ensures that the marginal utility remains a single-valued function. The marginal utility of a decision variable is the change in the utility function when that variable changes from 0 to 1, with all other decision variables held constant. The marginal utility vector is a real-valued vector whose components are the marginal utilities of each variable in the decision space at some point.

Schedule Change Processing

Figure 6:
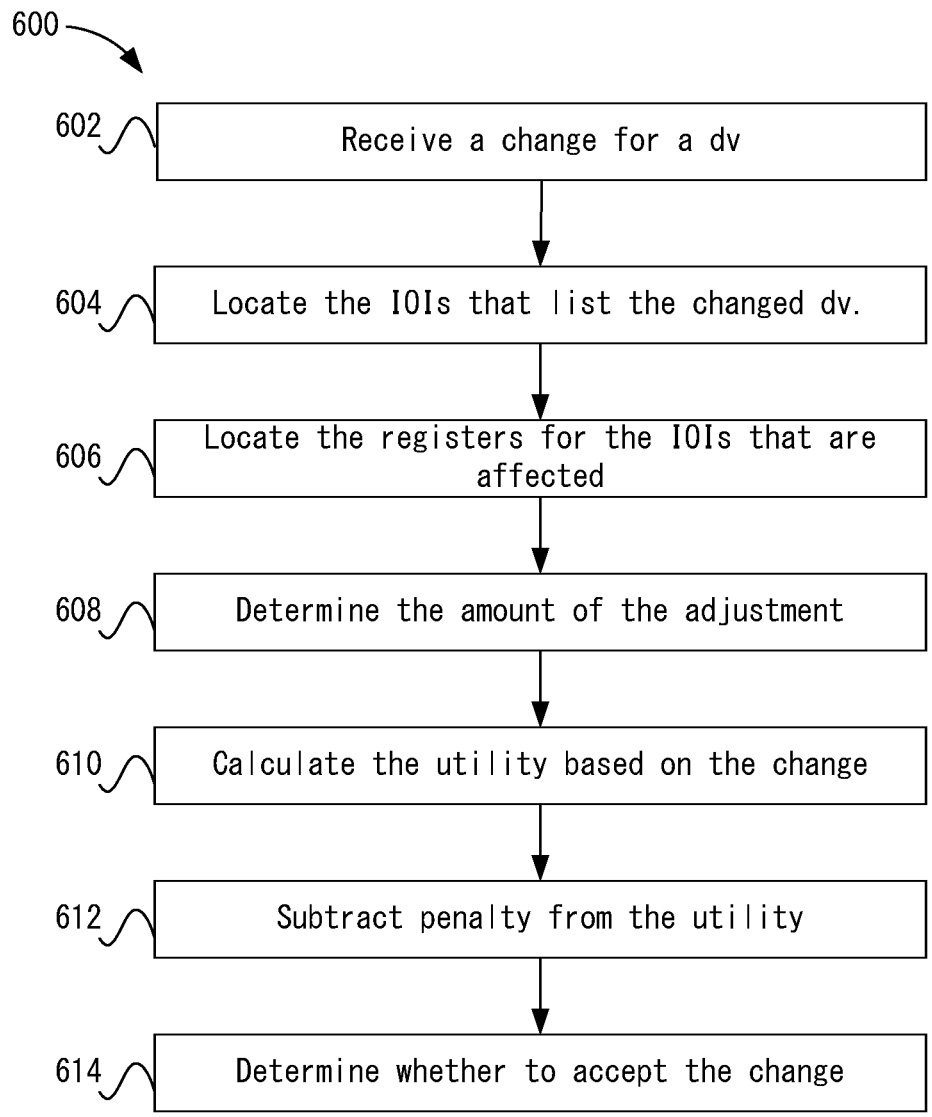
FIG. 6 depicts a simplified flowchart of a method for calculating the change in utility when a change is made according to one embodiment.

At certain points after the initial optimization, changes may occur to the schedule. Particular embodiments use the IOIs and a penalty to enable schedule optimizer 204 to not have to recalculate the whole schedule to determine the effect of the change. For example, if a change occurs for one satellite, then schedule optimizer 204 evaluates the change with respect to that satellite without considering any other satellites. This allows the time needed to evaluate a change to be constant with respect to the number of satellites in the system after the initial optimization. That is, to evaluate a change, the evaluation may involve the same number of calculations or time irrespective of the number of satellites in the system after the initial optimization is performed. FIG. 6 depicts a simplified flowchart 600 of a method for calculating the change in utility when a change is made according to one embodiment. This change may occur during an optimization or when a change to the system results in which schedule optimizer 204 may need to change the schedule. At 602, schedule optimizer 204 receives a change for a dv. For example, the status for a dv may be changed from skip to take, or from take to skip. In one example, dv #5 may be changed from 1 to 0. The change may occur based on a change in the operating state of system 100, such as a ground station fails, or a user may change the state for various reasons.

Then, at 604, schedule optimizer 204 locates the IOIs that list the changed dv. For example, when dv #5 is changed from 1 to 0, schedule optimizer 204 may identify IOI #1 and IOI #2 as being affected by that change. Further, although it is assumed that the dv is associated with an IOI, it may be the case that the dv is not associated with any IOIs and thus no penalty is assessed.

Then, at 606, schedule optimizer 204 locates the registers for the IOIs that are affected. At 608, schedule optimizer 204 determines the amount of the adjustment. Then, at 610, schedule optimizer 204 calculates the utility based on the change. The utility may be calculated as described above. For example, the utility has gone down because one action that was listed as being taken is now listed as skipped. Then, the penalty is subtracted from the utility to determine the gross utility at 612. Accordingly, the penalty for the change was calculated without having to look at the other dvs for other satellites that are not registered with the IOIs. That is, at time zero, the values for the registers were set based on the conflicts. Then, after time zero, when a change occurs to a satellite, the penalty can be calculated without considering how the change affects the other satellites. That is, the values in the registers quantify the penalty based on the conflicts with other satellites. However, to determine the effect of a change for one satellite, the value of the penalty can be changed based on only the change from the satellite.

To calculate the gross utility, the utility may go up because the dv is now taken, but the penalty increases and is subtracted from the utility. For example, the utility for changing dv #5 from 1 to 0 may decrease the utility from 5 to 4.5. However, the penalty is decreased from 4 to 3 for IOI #1 and from 1 to 0 for IOI #2. Thus, the gross utility increases by 1.5 given the utility decreases by 0.5 and the penalty decreases by 2. At 614, schedule optimizer 204 determines if the change should be accepted. For example, the change due to the event that occurred may not increase utility. In this case, schedule optimizer 204 may attempt to find another change that increases utility. This optimization may proceed as described in FIG. 4.

Figure 7:
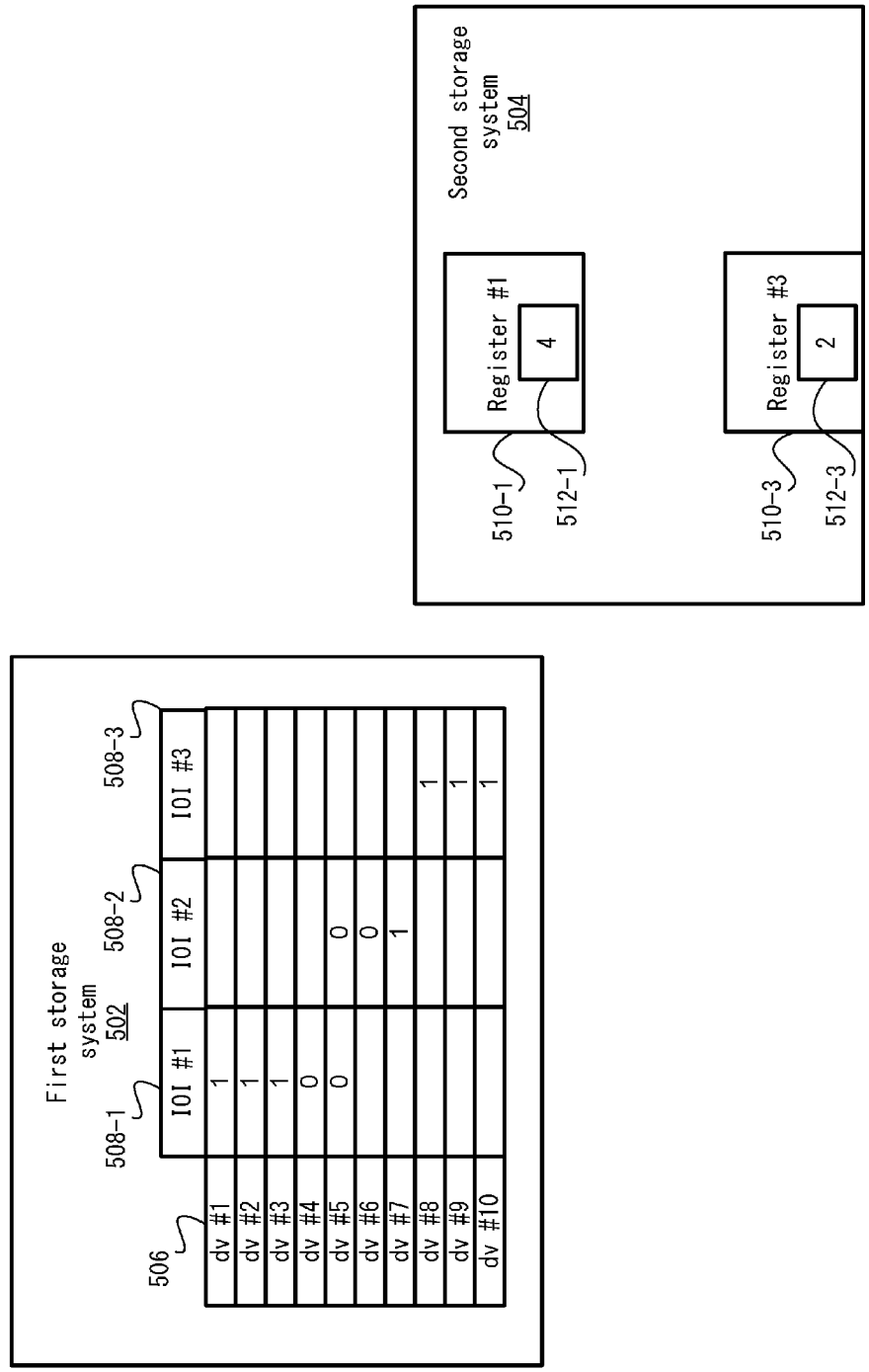
FIG. 7 shows the result of the change of dvs according to one embodiment.

FIG. 7 shows the result of the change. In first storage system 502, dv #5 has been changed from 1 to 0. Also, the penalty for register #1 has been changed from 4 to 3. There is not a conflict anymore for IOI #2 and thus register #2 is no longer used. However, register #2 could still be used and has a value of 0.

Without the use of penalties, the effect of the change on one satellite would have to be recalculated on the whole system. This would involve evaluating all dvs again to see if they conflict.

Computer System

Figure 8:
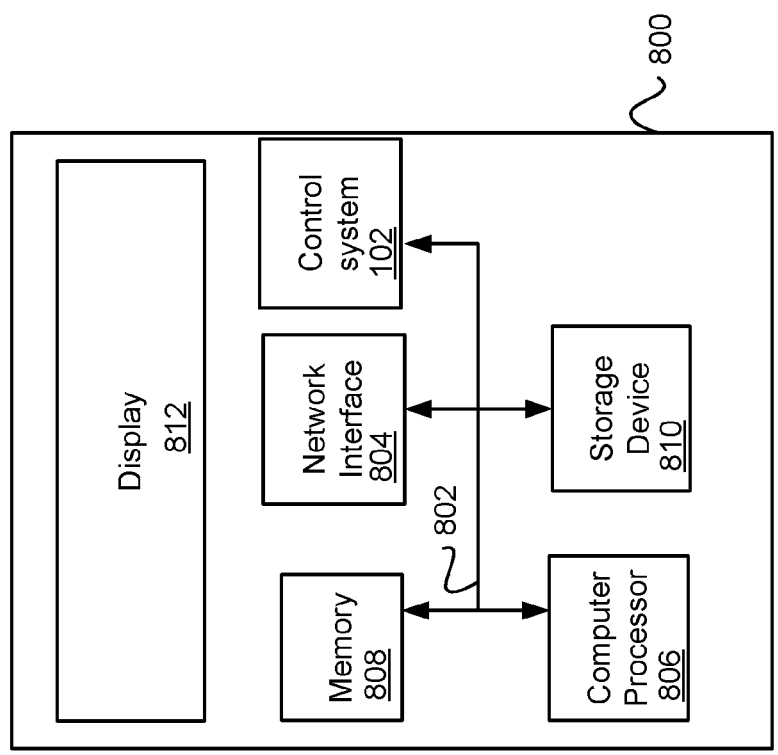
FIG. 8 illustrates an example of a special purpose computer system configured with control system 102 according to one embodiment.

FIG. 8 illustrates an example of a special purpose computer system 800 configured with control system 102 according to one embodiment. Only one instance of computer system 800 will be described for discussion purposes, but it will be recognized that computer system 800 may be implemented for other entities described above.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through a network. In some examples, client-server communications occur through the network. Also, implementations of particular embodiments may be distributed across computer systems 800 through the network.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for scheduling actions in a satellite system comprising a plurality of satellites that are imaging a body, the method comprising:
   receiving, by a computing device, a set of decision variables describing actions to be taken for components of a satellite with respect to a schedule for the plurality of satellites to image the body while the plurality of satellites are orbiting the body;
   generating, by the computing device, a set of conflicts for decision variables that cannot be performed at a same time in the schedule, wherein each conflict is associated with a list of decision variables;
   calculating, by the computing device, a penalty value for each conflict in the set of conflicts that is based on the list of decision variables associated with each conflict, the penalty representing an impact on utility;

storing, by the computing device, penalty values for each conflict in a first storage element and the list of decision variables in a second storage element;

adjusting, by the computing device, a decision variable value for one of the set of decision variables to change the schedule;

calculating, by the computing device, a utility value using a utility function, the utility value measuring a value of the adjusted decision variable value on the schedule;

locating, by the computing device, a conflict that includes the adjusted decision variable in the list of decision variables from the second storage element;

calculating, by the computing device, an adjusted penalty value based on the adjusted decision variable value and the penalty value stored in the first storage element for the located conflict;

evaluating, by the computing device, the adjusting based on the utility value and the penalty value to determine whether to accept the adjusted decision variable value to change the schedule; and controlling, by the computing device, at least one satellite in the plurality of satellites using an adjusted schedule based on the adjusted decision variable.

2. The method of claim 1, further comprising:
continuing to adjust decision variable values, calculating the utility value and adjusted penalty value for the adjusted decision variable values; and
continuing to evaluate the adjusting until the schedule is considered optimized.

3. The method of claim 1, wherein the schedule does not obtain a desired coverage of the object, the method further comprising:
receiving feedback from at least a portion of the plurality of satellites that are imaging the body; and
determining the adjusted decision variable based on the feedback.

4. The method of claim 1, wherein the set of decision variables include future actions that may be taken by the plurality of satellites.

5. The method of claim 1, wherein a potential penalty value when a conflict occurs is larger than a potential utility value for an adjusted decision variable value.

6. The method of claim 1, wherein decision variable comprises a communication with a ground station in which only one satellite is allowed to communicate with the ground station at a single time.

7. The method of claim 6, wherein the utility value and the penalty value for the list of decision variables associated with the conflict are calculated independently from other decision variables not in the list of decision variables.

8. The method of claim 1, wherein the list of decision variables involve either ground state communication or imaging actions of the satellites that are duplicative at a same time.

9. The method of claim 1, wherein a processing time to determine whether to accept the adjusted decision variable value is less than a processing time to evaluate all the decision variables based on the adjusted decision variable value.

10. The method of claim 1, further comprising:
locking one or more of the decision variables from being adjusted.

11. The method of claim 1, wherein the utility function produces a single valued utility.

12. The method of claim 11, wherein the utility function is weighted by a heat value relating to an importance of imaging an area of the body.

13. The method of claim 1, wherein a processing time for generating the schedule does not increase in proportion to a number of the plurality of satellites being evaluated.

14. The method of claim 13, wherein evaluating reviews only decision variables in the list of decision variables to determine whether to accept the adjusted decision variable value.

15. The method of claim 1, wherein the at least one satellite is controlled using the adjusted schedule before the schedule of imaging of the body by the plurality of satellites is affected.

16. The method of claim 1, wherein a potential penalty value when a conflict occurs is larger than a potential utility value for an adjusted decision variable value, wherein calculating the penalty value comprises:
searching for any conflicts that include the adjusted decision variable; and
adjusting the penalty value in the first storage element for the conflicts that include the adjusted decision variable based on the adjusted decision variable value.

17. The method of claim 1, wherein the list of decision variables take an action at a same time in which only one of the actions are allowed to be active at the same time.

18. The method of claim 1, wherein calculating the penalty comprises:
determining a status for the list of decision variables; and
calculating the penalty value based on the status, wherein the penalty value is larger when the status indicates a larger number of decision variables conflict at the same time in the schedule.

19. The method of claim 18, wherein the status comprises a take status where the action is taken for the decision variable and a skip status where the action is not taken for the decision variable.

20. The method of claim 1, wherein the adjusting of a decision variable value for one of the decision variables is random.

21. The method of claim 20, wherein when the random adjusting results in an improved utility value, the adjusted decision variable value is accepted.

22. The method of claim 1, wherein the adjusted decision variable value is adjustable to a take status where the action is taken for the decision variable and a skip status where the action is not taken for the decision variable.

23. The method of claim 1, further comprising:
estimating a probability that a decision variable in the set of decision variables will occur;
selecting the decision variable to occur;
observing a outcome of the decision variable from a satellite performing imaging of the body; and
adjusting the probability that the decision variable will occur based on the observed outcome.

24. The method of claim 23, wherein when the decision variable does not occur and the schedule is adjusted using the adjusted decision variable value to compensate for the adjusted probability of the decision variable not occurring.

25. The method of claim 24, wherein the decision variable not occurring does not result in a loss of utility proportionate to a predicted gross utility of the decision variable by the adjusting of the schedule to use the adjusted decision variable value.

26. The method of claim 10, wherein locking comprises:
selecting a portion of decision variables to prioritize;
locking the unselected decisions variables; and calculating the utility value using the utility function for the unlocked decision variables.

27. An apparatus for scheduling actions in a satellite system comprising a plurality of satellites that are imaging a body, the apparatus comprising:
one or more computer processors; and
a non-transitory computer-readable storage medium comprising instructions, that when executed, control the one or more computer processors to be configured for:
receiving a set of decision variables describing actions to be taken for components of a satellite with respect to a schedule for the plurality of satellites to image the body while the plurality of satellites are orbiting the body;
generating a set of conflicts for decision variables that cannot be performed at a same time in the schedule, wherein each conflict is associated with a list of decision variables;
calculating a penalty value for each conflict in the set of conflicts that is based on the list of decision variables associated with each conflict, the penalty representing an impact on utility;
storing penalty values for each conflict in a first storage element and the list of decision variables in a second storage element;
adjusting a decision variable value for one of the set of decision variables to change the schedule;
calculating a utility value using a utility function, the utility value measuring a value of the adjusted decision variable value on the schedule;
locating a conflict that includes the adjusted decision variable in the list of decision variables from the second storage element;
calculating an adjusted penalty value based on the adjusted decision variable value and the penalty value stored in the first storage element for the located conflict;
evaluating the adjusting based on the utility value and the penalty value to determine whether to accept the adjusted decision variable value to change the schedule; and
controlling at least one satellite in the plurality of satellites using an adjusted schedule based on the adjusted decision variable.

28. A non-transitory computer-readable storage medium containing instructions for scheduling actions in a satellite system comprising a plurality of satellites that are imaging a body, the instructions, when executed, control a computer system to be configured for:
receiving a set of decision variables describing actions to be taken for components of a satellite with respect to a schedule for the plurality of satellites to image the body while the plurality of satellites are orbiting the body;
generating a set of conflicts for decision variables that cannot be performed at a same time in the schedule, wherein each conflict is associated with a list of decision variables;
calculating a penalty value for each conflict in the set of conflicts that is based on the list of decision variables associated with each conflict, the penalty representing an impact on utility;
storing penalty values for each conflict in a first storage element and the list of decision variables in a second storage element;
adjusting a decision variable value for one of the set of decision variables to change the schedule;
calculating a utility value using a utility function, the utility value measuring a value of the adjusted decision variable value on the schedule;
locating a conflict that includes the adjusted decision variable in the list of decision variables from the second storage element;
calculating an adjusted penalty value based on the adjusted decision variable value and the penalty value stored in the first storage element for the located conflict;
evaluating the adjusting based on the utility value and the penalty value to determine whether to accept the adjusted decision variable value to change the schedule; and
controlling at least one satellite in the plurality of satellites using an adjusted schedule based on the adjusted decision variable.

29. The non-transitory computer-readable storage medium of claim 28, further comprising:
continuing to adjust decision variable values, calculating the utility value and adjusted penalty value for the adjusted decision variable values; and
continuing to evaluate the adjusting until the schedule is considered optimized.

30. The non-transitory computer-readable storage medium of claim 28, wherein the schedule does not obtain a desired coverage of the object, the method further comprising:
receiving feedback from at least a portion of the plurality of satellites that are imaging the body; and
determining the adjusted decision variable based on the feedback.

31. The non-transitory computer-readable storage medium of claim 28, wherein the set of decision variables include future actions that may be taken by the plurality of satellites.

32. The non-transitory computer-readable storage medium of claim 28, wherein a potential penalty value when a conflict occurs is larger than a potential utility value for an adjusted decision variable value.

33. The non-transitory computer-readable storage medium of claim 28, wherein decision variable comprises a communication with a ground station in which only one satellite is allowed to communicate with the ground station at a single time.

* * * * *